United States Patent
Kim et al.

(10) Patent No.: US 11,614,097 B2
(45) Date of Patent: Mar. 28, 2023

(54) HYDROPHILIC TOOTHED IMPELLER TYPE OIL TRANSPORTATION DEVICE

(71) Applicant: KOREA INSTITUTE OF SCIENCE AND TECHNOLOGY, Seoul (KR)

(72) Inventors: Seong-Jin Kim, Seoul (KR); Myoung-Woon Moon, Seoul (KR); Young-jin Lee, Seoul (KR); Seo-Hyun Cho, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 0 days.

(21) Appl. No.: 17/696,868

(22) Filed: Mar. 17, 2022

(65) Prior Publication Data
US 2023/0010254 A1    Jan. 12, 2023

(30) Foreign Application Priority Data
Jul. 8, 2021   (KR) .......................... 10-2021-0089633

(51) Int. Cl.
*F04D 29/70*   (2006.01)
*F04D 29/18*   (2006.01)

(52) U.S. Cl.
CPC ............ *F04D 29/708* (2013.01); *F04D 29/18* (2013.01)

(58) Field of Classification Search
CPC ... F04D 3/00; F04D 3/005; F04D 3/02; F04D 7/04; F04D 7/045; F04D 29/007;
(Continued)

(56) References Cited

U.S. PATENT DOCUMENTS 2,313,413 A * 3/1943 Weske .................. F04D 19/002
                                                           416/129
3,075,743 A * 1/1963 Sheets ..................... F01D 5/142
                                                          416/198 A
(Continued)

FOREIGN PATENT DOCUMENTS

CN    111692124    *    9/2020
CN    113398714    *    6/2021
(Continued)

OTHER PUBLICATIONS

Korean Office Action for KR Application No. 10-2021-0089633 dated Nov. 17, 2022. In conformance with MPEP 609—Concise explanation of the relevance includes issue date of KR OA.

*Primary Examiner* — Woody A Lee, Jr.
*Assistant Examiner* — Brian O Peters
(74) *Attorney, Agent, or Firm* — Cantor Colburn LLP

(57) ABSTRACT

The present disclosure is directed to providing impeller type oil transportation device including; a transport unit provided such that a mixed fluid including an oil is fed on one side; and an impeller provided in the transport unit, the impeller including a core connected to a rotation axis, and wings extending radially from the core and having hydrophilic teeth on an outer surface to transport the mixed fluid including the oil to the other side of the transport unit by rotation, wherein the impeller is provided in the transport unit such that parts of the wings are exposed above a surface of the mixed fluid, to separate the oil adhered to the teeth while the mixed fluid is fed into a space between the adjacent teeth by capillary flow when the wings exposed above the surface of the mixed fluid move on to the mixed fluid by the rotation.

8 Claims, 14 Drawing Sheets

(58) Field of Classification Search
CPC ...... F04D 29/026; F04D 29/18; F04D 29/181;
F04D 29/70; F04D 29/708; F03D 1/06;
F03D 1/0608; F03D 1/0633; F03D
1/0641; F03D 1/065; F03D 1/0675; F03D
1/0683
USPC ...................................... 210/242.3, 922, 923
See application file for complete search history.

(56) References Cited

U.S. PATENT DOCUMENTS 4,599,041 A * 7/1986 Stricker .................. F04D 29/36
415/222
2016/0341203 A1* 11/2016 Parsons ................ F04D 29/506
2017/0335531 A1* 11/2017 Smothers .............. F04D 13/086

FOREIGN PATENT DOCUMENTS

| KR | 10-1670261 B1 | 10/2016 | |
|----|---|---|---|
| KR | 10-2020-0093853 A | 8/2020 | |
| KR | 10-2021-0069946 A | 6/2021 | |
| WO | WO-2016178387 A1 * | 11/2016 | ............... E02B 7/20 |

* cited by examiner (a)

(b)

(c)

(a)

(b)

(a)

(b)

(a)

(b)

(c)

HYDROPHILIC TOOTHED IMPELLER TYPE OIL TRANSPORTATION DEVICE

CROSS-REFERENCE TO RELATED APPLICATION

This application claims priority to Korean Patent Application No. 10-2021-0089633, filed on Jul. 8, 2021, and all the benefits accruing therefrom under 35 § 119, the contents of which in its entirety are herein incorporated by reference.

BACKGROUND

1. Field

The present disclosure relates to an oil transportation device, and more particularly, to a hydrophilic toothed impeller type oil transportation device for transporting oil in a transport unit while preventing the adhesion and buildup of the oil by an impeller having hydrophilic teeth in wings.

2. Description of the Related Art

Recently, oil spill accidents frequently occur in oceans or rivers by a variety of reasons, and when oil spill accidents occur in oceans or rivers, oil or Hazardous & Noxious Substance (HNS) on sea or river surfaces spreads out quickly, causing severe environmental pollution.

Accordingly, to prevent water pollution, above all else, it is the most important to prevent accidents of a variety of transportation means including ships moving across oceans or rivers, and when oil or HNS spill accidents occurred, it is important to remove the spilled oil or HNS quickly.

However, when a rotating impeller is used in the process of transporting the recovered oil or NNS, oil easily adheres to the impeller, and the adhered oil becomes solid and builds up inside a pipe, resulting in the reduced cross-sectional flow area of the pipe, and as a consequence, the increased pressure difference or the dogged pipe.

FIG. 1 is an exemplary diagram showing the above-described example, and illustrates that a propeller type impeller 20 for transporting oil O is provided in a transport pipe 10 which transports the oil O.

As shown in FIG. 1, the oil O easily adheres to the impeller 20, and the adhered oil O is cooled by heat exchange with water W and becomes solid S which in turn, creates buildup on the impeller 20, thereby failing to continuously transport the oil O.

Accordingly, oil transportation using the impeller has problems with the reduced cross-sectional flow area in the transport pipe, the reduced transportation efficiency and the consequential pressure rise, causing oil leaks or pipe bursting at the pipe joint, resulting in oil spills in the ocean or river again.

Additionally, when stopping the oil spill recovery work and performing the maintenance and repair work to remove the created solids, since the recovery work is not performed, contaminants spread out again, causing great damage.

Furthermore, according to IMO2020 environmental regulation policy which came into force on Jan. 1, 2020, ships are required to use low sulphur fuel oil (LSFO) with sulphur content of marine fuel oil of less than 0.5%, but LSFO is quite adhesive so the above-described problems tend to become more aggravated.

In the field of oil production industry, to solve the solids buildup issue, technology has been developed to form a coating layer in the oil pipe to reduce the buildup of solids such as waxes.

However, the technology which forms the coating layer in the oil pipe can reduce the solids buildup on the outer wall of the pipe, but cannot solve the problem with solids buildup on the rotating impeller or oil adsorption onto the impeller.

RELATED LITERATURES

Patent Literature

Korean Patent No. 10-1670261 (registered on Oct. 24, 2016)

SUMMARY

The present disclosure is designed in this background, and therefore the present disclosure is directed to providing an oil transportation device for separating oil adhered to wings from teeth by capillary flow, thereby preventing oil debris from remaining on the surface of the wings, and thus continuously performing the oil transportation work.

The present disclosure is further directed to providing an oil transportation device for separating oil adhered to wings from teeth by capillary flow, thereby preventing the creation of solids deposited when oil that has not been separated from the wings of the impeller and remains on the wings is cooled again.

The object of the present disclosure is not limited thereto, and other objects not mentioned herein will be clearly understood by those skilled in the art from the following description.

To achieve the above-described object, an embodiment of the present disclosure provides a hydrophilic toothed impeller type oil transportation device including: a transport unit provided such that a mixed fluid including an oil is fed on one side; and an impeller provided in the transport unit, the impeller including a core connected to a rotation axis, and wings extending radially from the core and having hydrophilic teeth on an outer surface to transport the mixed fluid including the oil to the other side of the transport unit by rotation, wherein the impeller is provided in the transport unit such that parts of the wings are exposed above a surface of the mixed fluid, to separate the oil adhered to the teeth while the mixed fluid is fed into a space between the adjacent teeth by capillary flow when the wings exposed above the surface of the mixed fluid move on to the mixed fluid by the rotation.

Additionally, there is provided the hydrophilic toothed impeller type oil transportation device, wherein the teeth are formed radially along a lengthwise direction of the wings, and are formed along a chord direction of the wings.

Additionally, there is provided the hydrophilic toothed impeller type oil transportation device, wherein the mixed fluid includes water.

Additionally, there is provided the hydrophilic toothed impeller type oil transportation device, wherein the teeth have a nanostructure on a surface thereof, the nanostructure of at least one type selected from the group consisting of a nano-hair and a nano-pillar.

Additionally, there is provided the hydrophilic toothed impeller type oil transportation device, wherein the teeth are made of a porous material which absorbs water in the porous material.

Additionally, there is provided the hydrophilic toothed impeller type oil transportation device, wherein the teeth have a front inclination angle of a tooth front surface of 45° or more and a rear inclination angle of a tooth rear surface of 45° or more.

Additionally, there is provided the hydrophilic toothed impeller type oil transportation device, wherein the teeth have a front inclination angle of a tooth front surface and a rear inclination angle of a tooth rear surface which are different from each other.

Additionally, there is provided the hydrophilic toothed impeller type oil transportation device, wherein the teeth are 1 mm to 6 mm in height and 1 mm to 6 mm in width.

According to an embodiment of the present disclosure, it is possible to separate the oil adhered to the wings from the teeth by capillary flow, thereby preventing oil debris from remaining on the surface of the wings, and thus continuously performing the oil transportation work.

Additionally, it is possible to separate the oil adhered to the wings from the teeth by capillary flow, thereby preventing the creation of solids deposited when oil that has not been separated from the wings of the impeller and remains on the wings is cooled again.

DETAILED DESCRIPTION

Figure 1:
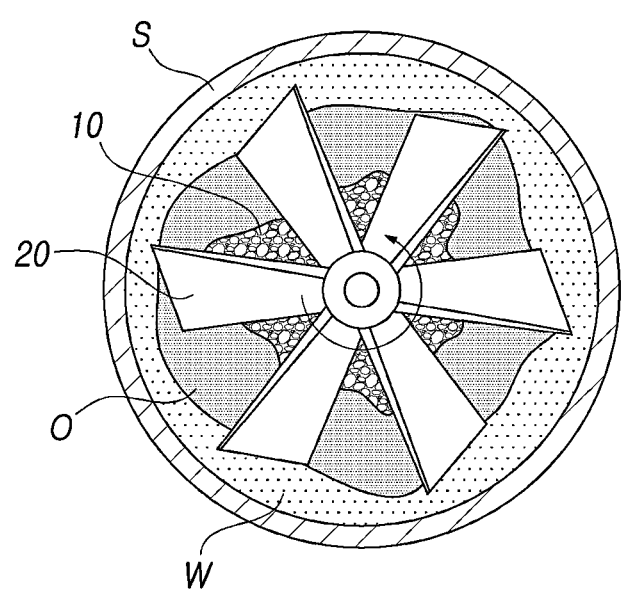
FIG. 1 is a front view showing the inside of an oil transportation device according to the related art.

Hereinafter, some embodiments of the present disclosure will be described in detail through the exemplary drawings. It should be noted that in adding the reference signs to the elements of each drawing, like reference signs denote like elements as far as possible even though they are indicated on different drawings. Additionally, in describing the present disclosure, when a certain detailed description of relevant known elements or functions is determined to obscure the subject matter of the present disclosure, the detailed description is omitted.

Furthermore, in describing the elements of the present disclosure, the terms 'first', 'second', A, B, (a), (b), and the like may be used. These terms are only used to distinguish one element from another, and the nature of the corresponding element or its sequence or order is not limited by the term. It should be understood that when an element is referred to as being "connected", "coupled" or "linked" to another element, it may be directly connected or linked to other element, but intervening elements may be "connected", "coupled" or "linked" between each element.

As shown in the drawings, a hydrophilic toothed impeller type oil transportation device according to an embodiment of the present disclosure includes: a transport unit 100 provided such that a mixed fluid L including oil O is fed on one side; and an impeller 200 provided in the transport unit 100 and including a core 210 connected to a rotation axis 310, and wings 230 extending radially from the core 210 and having hydrophilic teeth 250 on the outer surface, to transport the mixed fluid L including the oil O to the other side of the transport unit 100 by rotation, wherein the impeller 200 is provided in the transport unit 100 such that parts of the wings 230 are exposed above the surface of the mixed fluid L, to separate the oil O adhered to the teeth 250 while the mixed fluid L is fed into the space between the adjacent teeth 250 by capillary flow when the wings 230 exposed above the surface of the mixed fluid L move on to the mixed fluid L by the rotation.

Hereinafter, each component of the present disclosure will be described in detail with reference to FIGS. 1 to 14.

First, the transport unit 100 is provided such that the mixed fluid L including the oil O is fed on one side.

The transport unit 100 according to an embodiment of the present disclosure may be provided, for example, in the shape of a pipeline including a plurality of pipe members provided to transport the mixed fluid L including the oil O.

One side of the transport unit 100 may be connected to an oil recovery device which recovers the oil O spilled in seawater, and accordingly, the mixed fluid L including the oil O recovered by the oil recovery device may be fed on one side of the transport unit 100.

The mixed fluid L may include not only the oil O recovered by the oil recovery device but also water, and in addition to the water, may include a variety of Hazardous & Noxious Substances (HNSs) spilled in seawater.

Figure 5:
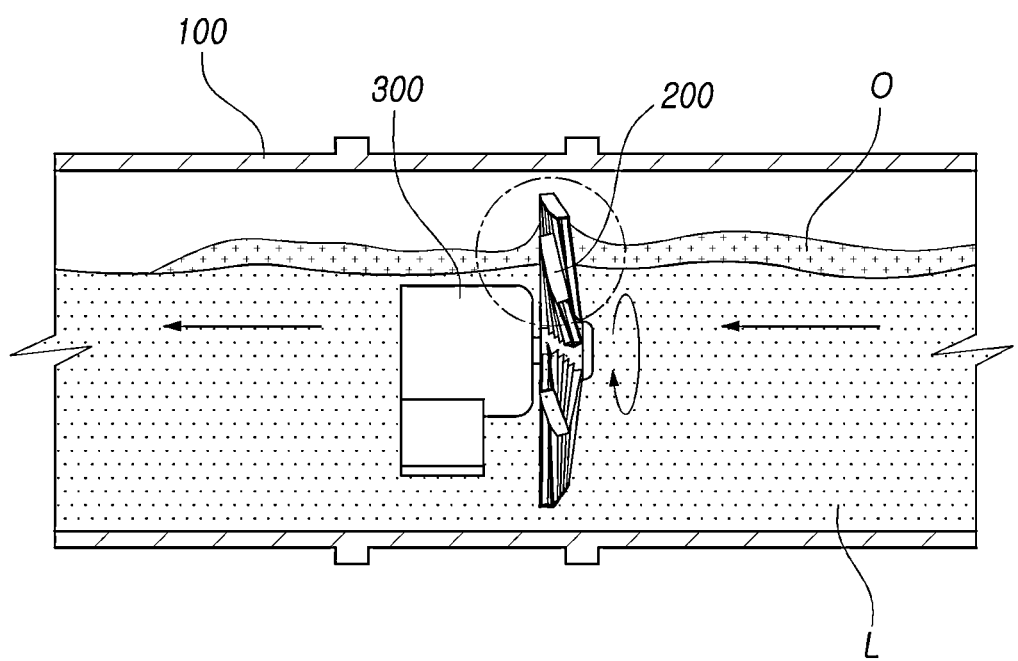
FIG. 5 is a side view showing the inside of an oil transportation device according to an embodiment of the present disclosure when viewed from Z direction of FIG. 4.

Meanwhile, as shown in FIG. 5, the impeller 200 is provided in the transport unit 100 such that it rotates by a driving means 300, and the mixed fluid L including the oil O fed into one side of the transport unit 100 may be transported to the other side of the transport unit 100 by the impeller 200.

In this instance, the other side of the transport unit 100 may be connected to an oil storage in which the recovered oil O is stored, and accordingly, the oil O transported through the transport unit 100 may be finally recovered in the oil storage.

Figure 2:
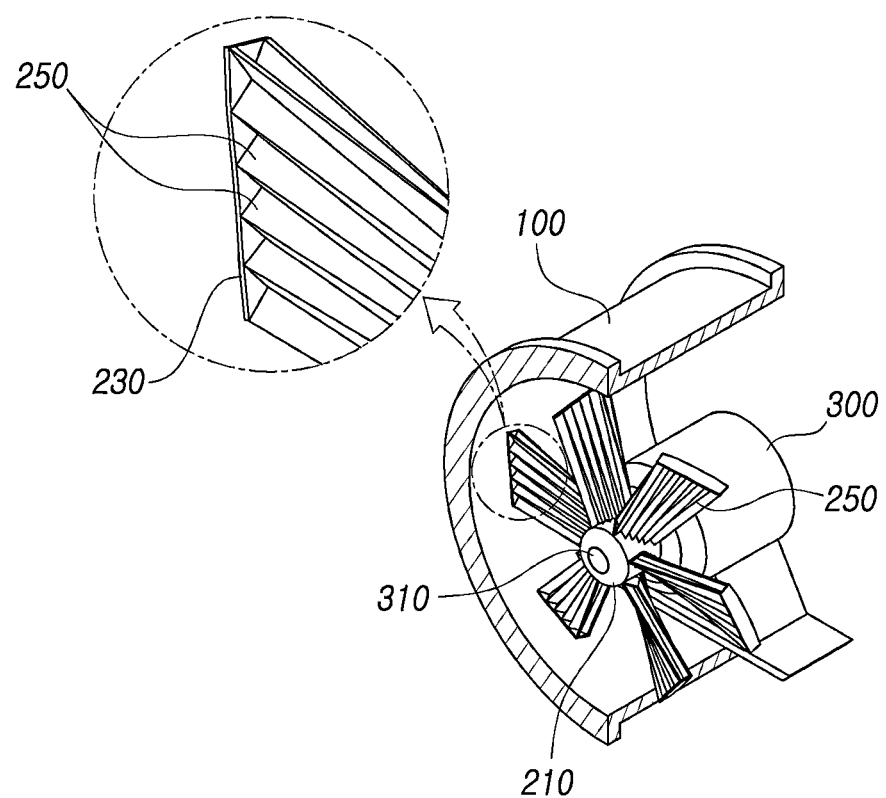
FIG. 2 is a perspective view showing the whole configuration of an oil transportation device according to an embodiment of the present disclosure.
Figure 3:
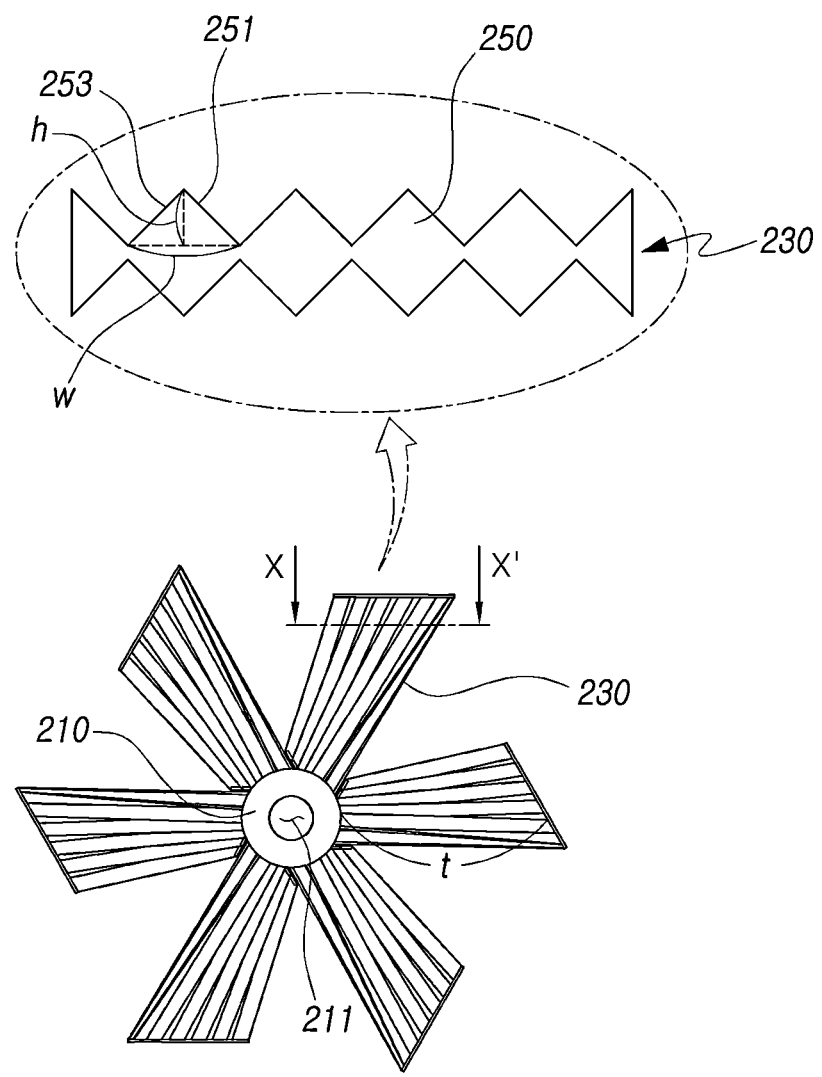
FIG. 3 is a front view showing the whole configuration of an impeller of an oil transportation device according to an embodiment of the present disclosure and a cross-sectional view showing an X-X' cross section of impeller wings.

Subsequently, as shown in FIGS. 2 and 3, the impeller 200 is provided in the transport unit 100, and includes the core 210 connected to the rotation axis 310, and the wings 230 extending radially from the core 210 and having the hydrophilic teeth 250 on the outer surface to transport the mixed fluid L to the other side of the transport unit 100 by rotation.

The impeller 200 according to an embodiment of the present disclosure may be provided in the shape of a propeller, and as shown in FIG. 5, the impeller 200 is provided in the transport unit 100 to transport the mixed fluid L including the oil O fed into one side of the transport unit 100 to the other side of the transport unit 100 by rotation.

Meanwhile, the impeller 200 according to an embodiment of the present disclosure may include the core 210 and the wings 230.

First, the core 210 is a center part of the impeller 200 and has an axis connection hole 211 therein, and the rotation axis 310 of the driving means 300 is connected to the axis connection hole 211.

Here, the driving means 300 is a power source for rotating the impeller 200, and for example, the driving means 300 may be provided as an electric motor or an engine.

The driving means 300 may be provided inside of the transport unit 100 together with the impeller 200, or may be provided outside of the transport unit 100, and FIG. 5 shows that the driving means 300 is provided inside of the transport unit 100 together with the impeller 200.

Subsequently, the wings 230 extend radially from the core 210, and transport the mixed fluid L including the oil O to the other side of the transport unit 100 by rotation.

The wings 230 extend radially from the outer surface of the core 210, and may be spaced a predetermined distance apart along the circumferential direction of the core 210.

The wings 230 may have the outer surface inclined at a predetermined angle to the rotation plane in the same way as a propeller, in order to transport the mixed fluid L including the oil O by rotation.

Meanwhile, the wings 230 according to an embodiment of the present disclosure have the hydrophilic teeth 250 on the outer surface.

To be more specific, as shown in FIG. 3, the teeth 250 according to an embodiment of the present disclosure are formed in the shape of teeth including a tooth front surface 251 and a tooth rear surface 253 opposite each other and having a predetermined height h and width w, and particularly, the teeth 250 according to an embodiment of the present disclosure are made of a hydrophilic or superhydrophilic material.

Figure 6:
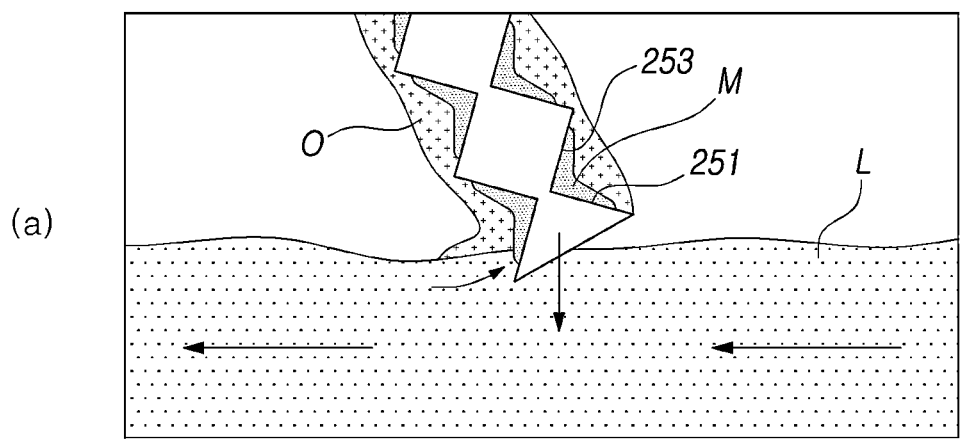
FIG. 6 is a diagram showing the separation of oil adhered to impeller wings by capillary flow with the movement on to a mixed fluid by rotation of the wings of an oil transportation device according to an embodiment of the present disclosure when viewed from Z direction of FIG. 4.
Figure 6:
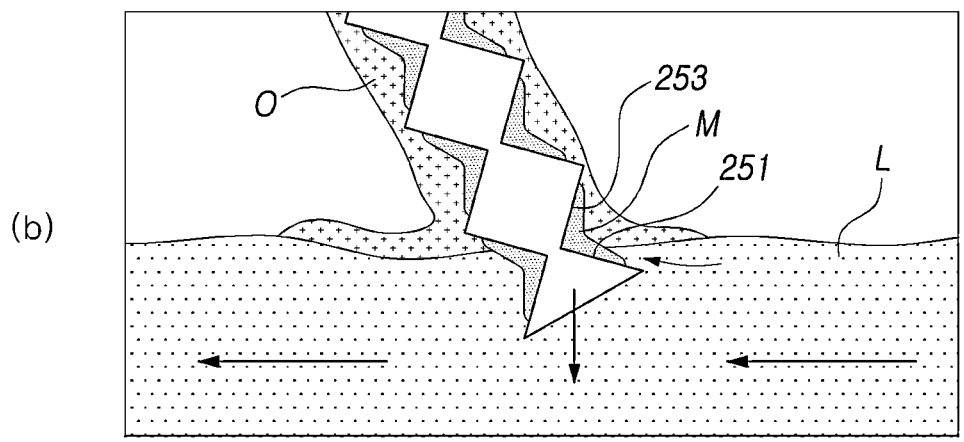
Figure 6:
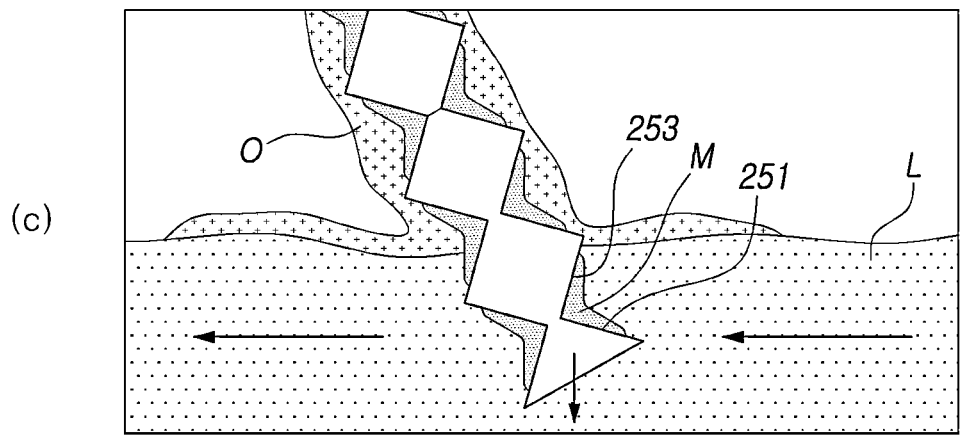

Here, as shown in FIG. 6, among the two opposite surfaces of the teeth 250, the tooth front surface 251 of the teeth 250 refers to a surface where the mixed fluid L starts to be fed in between the adjacent teeth 250 by capillary flow when the teeth 250 move on to the mixed fluid L by the rotation of the wings 230, and the tooth rear surface 253 of the teeth 250 refers to the other surface opposite the tooth front surface 251.

Since the wings 230 of the impeller 200 according to an embodiment of the present disclosure have the hydrophilic teeth 250, it is possible to prevent the oil O from continuously adhering to the outer surface of the wings 230, thereby continuously performing the transportation work of the mixed fluid L including the oil O by the impeller 200, and it will be described in detail below.

Meanwhile, as shown in FIG. 3, the teeth 250 according to an embodiment of the present disclosure are formed radially along the lengthwise direction of the wings 230, and may be formed along the chord direction of the wings 230.

Additionally, the teeth 250 according to an embodiment of the present disclosure may be formed on either one surface or the other surface of the wings 230 or both, and each drawing shows that the teeth 250 are formed on both one surface and the other surface of the wings 230.

Meanwhile, the impeller 200 according to an embodiment of the present disclosure is provided in the transport unit 100 such that parts of the wings 200 are exposed above the surface of the mixed fluid L, to separate the oil O adhered to the teeth 250 while the mixed fluid L is fed into the space between the adjacent teeth 250 by capillary flow when the wings 200 exposed above the surface of the mixed fluid L move on to the mixed fluid L by the rotation.

As shown in FIG. 1, in the case of the impeller type oil transportation device according to the related art, oil O being transported easily adheres to the impeller 20, and the oil O adhered to the impeller 20 is cooled by heat exchange with water VV and becomes solid S, which in turn, creates buildup on the impeller 20, thereby fading to continuously transport the oil O.

Figure 4:
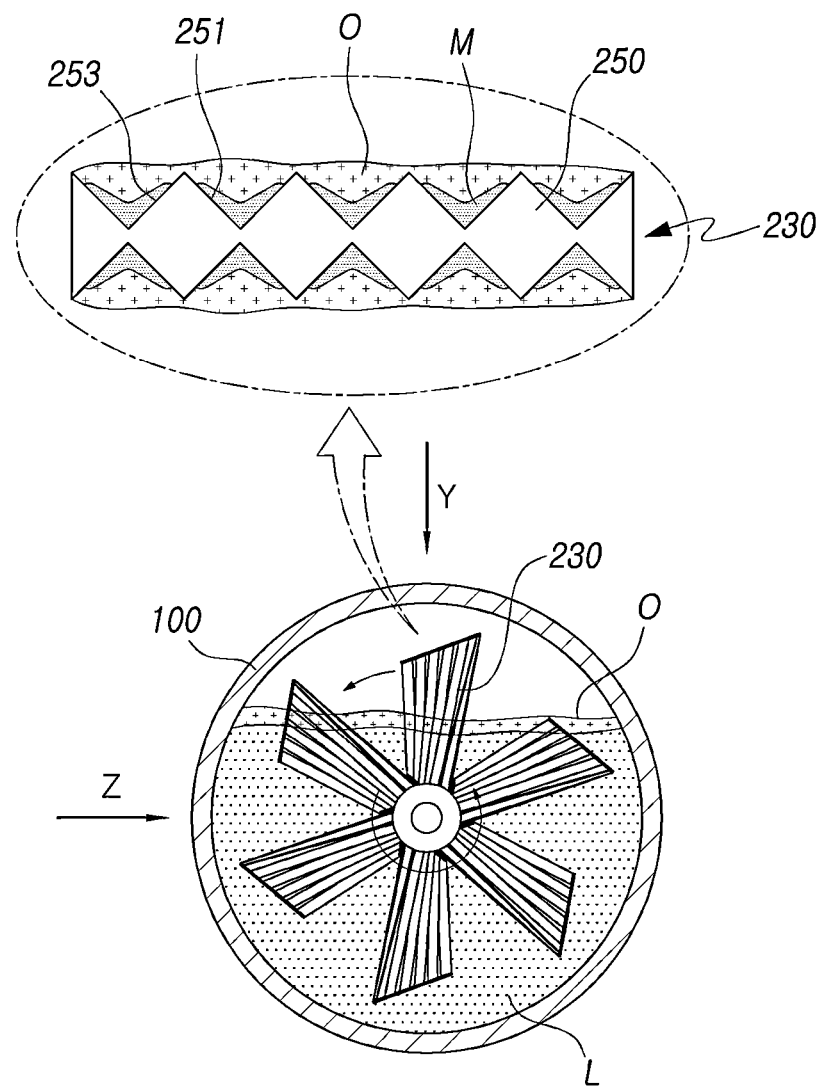
FIG. 4 is a front view showing the inside of an oil transportation device according to an embodiment of the present disclosure and a top view of impeller wings when viewed from Y direction.

As shown in FIG. 4, also in the case of the impeller 200 according to the present disclosure, the oil O adheres to the wings 230 of the impeller 200 in the process of transporting the mixed fluid L including the oil O.

Here, in the case of the impeller 200 according to the present disclosure, the wings 230 have the hydrophilic teeth 250 and are provided in the transport unit 100 such that parts of the wings 200 are exposed above the surface of the mixed fluid L, to separate the oil O adhered to the teeth 250 while the mixed fluid L is fed into the space between the adjacent teeth 250 by capillary flow when the wings 200 exposed above the surface of the mixed fluid L move on to the mixed fluid L by the rotation.

Describing the separation process of the oil O with reference to FIG. 6, when one surface (the right outer surface of the wings 230 in FIG. 6) of the wings 230 exposed above the surface of the mixed fluid L moves on to the mixed fluid L by the rotation of the impeller 200 (FIG. 6(A)), the mixed fluid L is rapidly fed into the space between the adjacent teeth 250 by capillary flow and pushes the oil O present in the space between the teeth 250 (FIG. 6(B)), and as the mixed fluid L is continuously fed into the space between the teeth 250, the oil O is completely separated from the teeth 250 (FIG. 6(C)).

FIG. 6 shows that the wings 230 also have the teeth 250 on the other surface (the left outer surface of the wings 230 in FIG. 6), and the oil O is separated from the wings 230 on the other surface of the wings 230 in the same way as one side of the wings 230.

Meanwhile, since the teeth 250 are hydrophilic or superhydrophilic as described above, a membrane M may be formed between the tooth front surface 251 and the tooth rear surface 253 of the teeth 250, and accordingly the oil O is not adhered to the entire surface of the teeth 250 and is only adhered to the end (tip) of the teeth 250, and since the oil O is only adhered to the end of the teeth 250, the separation process of the oil O from the teeth 250 by capillary flow may be done more easily.

Figure 7:
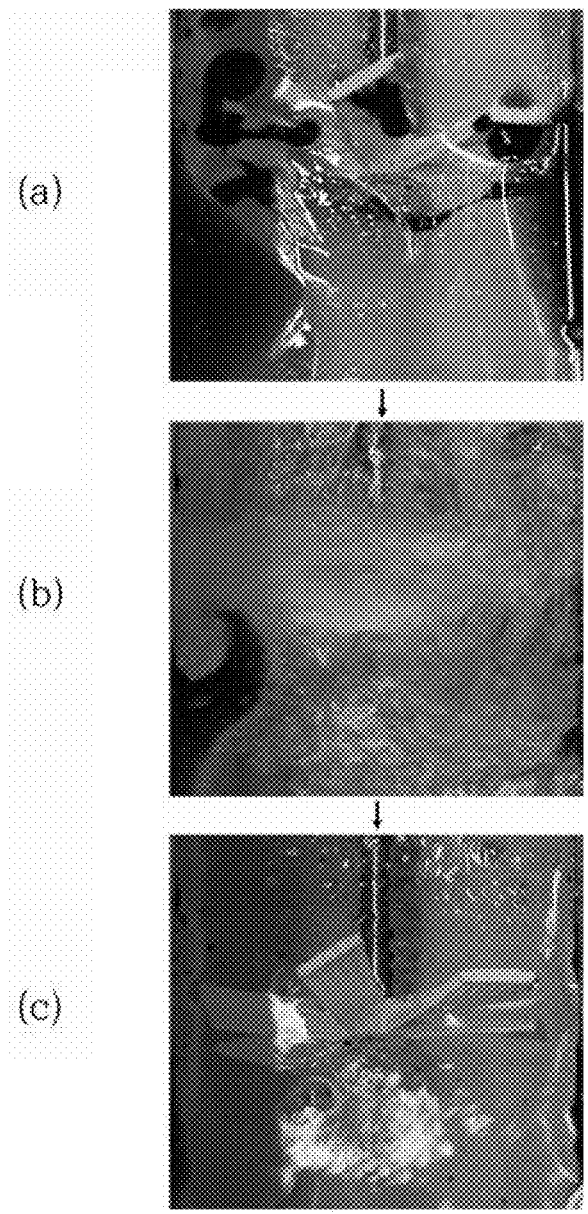
FIG. 7 is a photographic image showing that oil adhered to impeller wings provided in an oil transportation device according to an embodiment of the present disclosure is separated from the wings by rotation of the wings.

Meanwhile, FIG. 7 is a photographic image showing that oil adhered to the impeller wings provided in the oil transportation device according to an embodiment of the present disclosure is separated from the wings by the rotation of the wings, and FIG. 7 is a photographic image showing that oil adhered to the impeller wings provided in the oil transportation device according to the related art is not separated from the wings.

Figure 8:
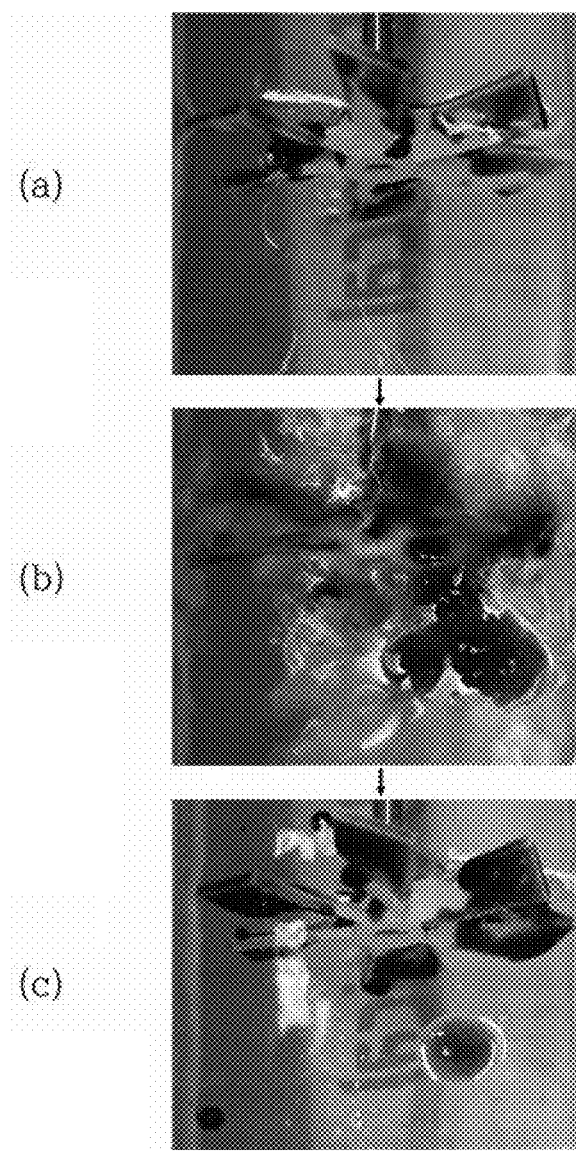
FIG. 8 is a photographic image showing that oil adhered to impeller wings provided in an oil transportation device according to the related art is not separated from the wings.

It can be seen that when the wings 230 have the teeth 250 as with the oil transportation device according to an embodiment of the present disclosure as shown in FIG. 7, the oil O adhered to the wings 230 is completely separated by the rotation of the impeller 200, but when the wings do not have the teeth as with the oil transportation device according to the related art as shown in FIG. 8, the oil O adhered to the wings is not separated by the rotation of the impeller.

Figure 9:
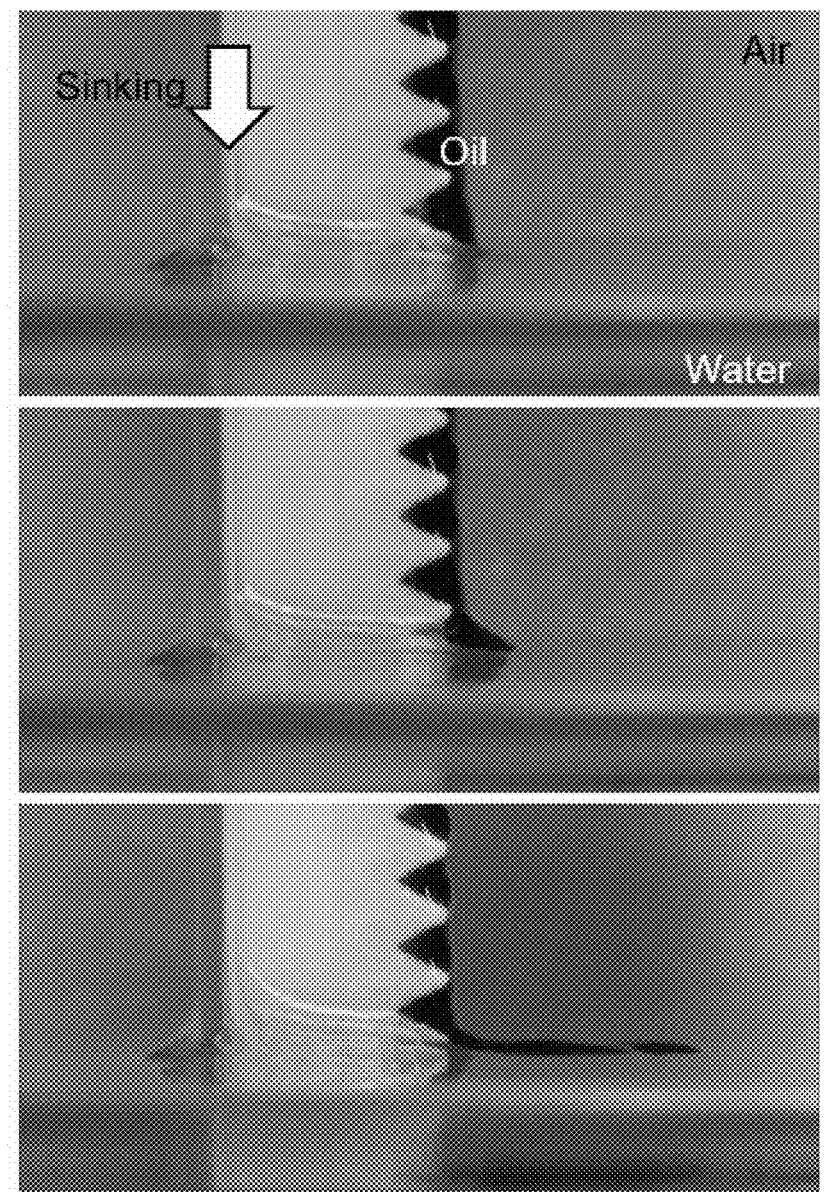
FIG. 9 is a photographic image showing a process of separating oil from teeth according to an embodiment of the present disclosure when viewed from the side.

Meanwhile, FIG. 9 shows the actual separation of the oil O from the teeth 250 by capillary flow with the movement of the wings 230 of the impeller 200 into the mixed fluid L.

Figure 10:
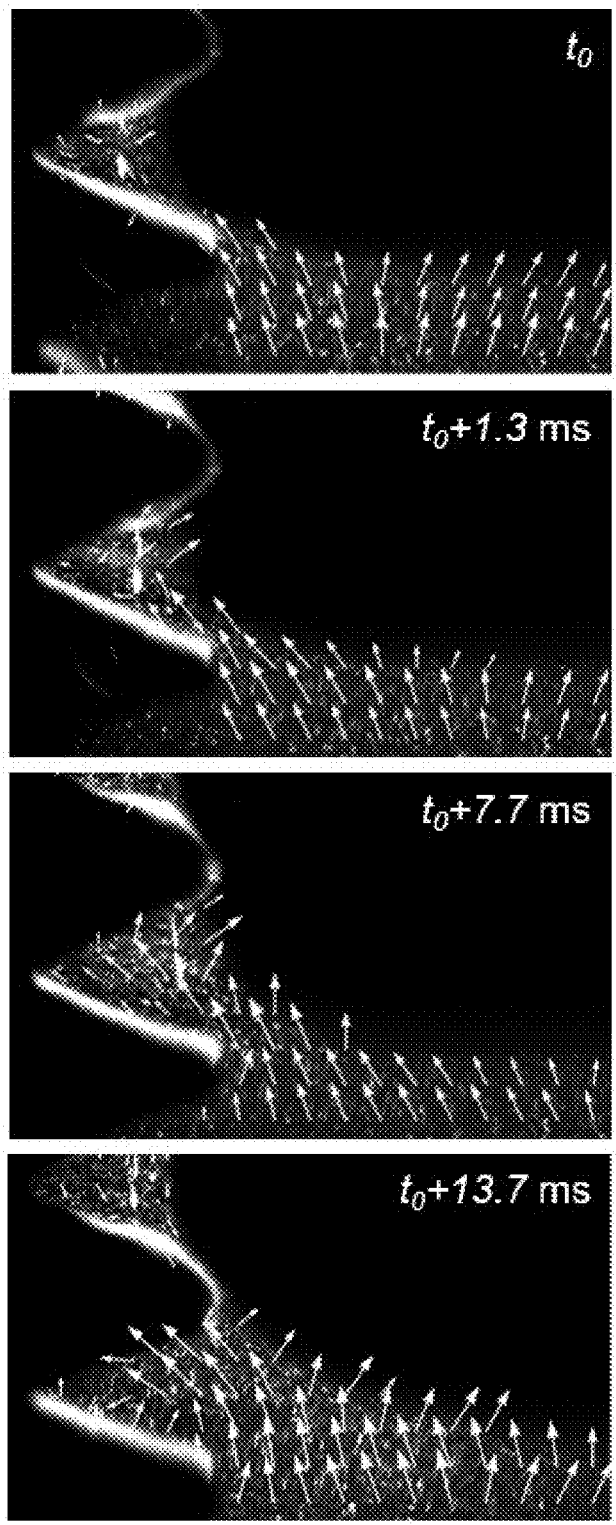
FIG. 10 is a photographic image showing a vector field representation of a flow of a mixed fluid into teeth according to an embodiment of the present disclosure by capillary flow in a Particle Image Velocimetry (PIV) test.

Meanwhile, FIG. 10 shows relative velocity vector fields as a result of a Particle Image Velocimetry (PIV) test on the separation of the oil O from the teeth 250 when the teeth 250 move into the mixed fluid L.

Referring to FIG. 10, it can be seen that a strong flow is formed near the space between the teeth 250 by capillary flow when the teeth 250 move into the mixed fluid L, and by the flow, the oil O is separated from the teeth 250 while the mixed fluid L is fed into the space between the adjacent teeth 250.

As described above, the impeller type oil transportation device according to an embodiment of the present disclosure has the hydrophilic teeth 250 on the outer surface of the wings 230 of the impeller 200 and is configured to separate the oil O adhered to the wing 230.

In this instance, the teeth 250 formed in the wings 230 may be formed with varying materials, shapes and sizes to separate the oil O from the wings 230 more effectively.

First, the teeth 250 may be made of a hydrophilic or superhydrophilic material to have hydrophilicity or superhydrophilicity as described above.

When the teeth 250 are made of a hydrophilic material, it is possible to maximize the capillary flow of the mixed fluid L including water, and accordingly it may be easier to separate the oil O from the teeth 250.

Additionally, when the teeth 250 are made of a hydrophilic material, it is possible to prevent the oil O present in the teeth 250 from directly attaching to the surface of the teeth 250 by the water, which makes it easier to prevent the oil O from the teeth 250.

Meanwhile, the teeth 250 may be made of a porous material which absorbs water in the porous material, and when the teeth 250 are made of a porous material which absorbs water in the porous material, the surface of the teeth 250 may be kept in water-wet state.

To be more specific, the teeth 250 may be made of a porous material containing micro pores, and in this instance, the pore may be 10 μm to 100 μm in size.

When the surface of the teeth 250 gets wet in water, it is possible to prevent the oil O present in the teeth 250 from coming into direct contact with and attaching to the surface the teeth 250 by the water, and accordingly it may be easier to separate the oil O from the teeth 250.

Meanwhile, the teeth 250 according to an embodiment of the present disclosure may have a nanostructure on the surface to improve hydrophilicity.

Here, the nanostructure may be at least one type selected from the group consisting of a nano-hair, a nanofiber, a nano-pillar, a nano-rod and a nano-wire.

Additionally, the nanostructure may be 1 μm or more in height and 2 μm or less in width, and the spacing between nanostructures may be 2 μm or less.

When the nanostructure is formed on the surface of the teeth 250, the membrane M may be formed on the surface of the teeth 250 by the improved hydrophilicity (superhydrophilicity) of the teeth 250 as shown in FIG. 4, and accordingly it is possible to minimize the contact surface between the teeth 250 and the oil O, and eventually, separate the oil O from the teeth 250 more easily.

Figure 11:
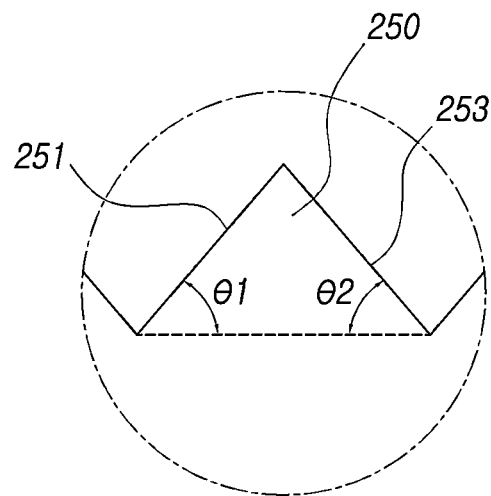
FIG. 11 is an enlarged diagram showing a tooth formed in an impeller wing of an oil transportation device according to an embodiment of the present disclosure.
Figure 11:
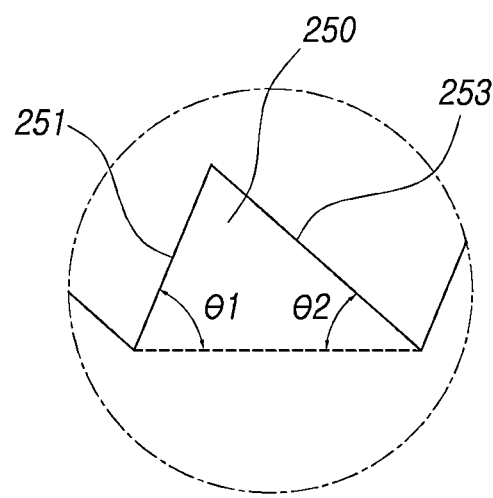

Subsequently, as shown in FIG. 11, the teeth 250 according to an embodiment of the present disclosure may be symmetrically formed such that a front inclination angle θ1 of the tooth front surface 251 and a rear inclination angle θ2 of the tooth rear surface 253 are equal, and may be asymmetrically formed such that the front inclination angle θ1 of the tooth front surface 251 and the rear inclination angle θ2 of the tooth rear surface 253 are different from each other.

First, as shown in FIG. 11(A), when the teeth 250 are symmetrically formed such that the front inclination angle θ1 of the tooth front surface 251 and the rear inclination angle θ2 of the tooth rear surface 253 are equal, each of the front inclination angle θ1 of the tooth front surface 251 and the rear inclination angle θ2 of the tooth rear surface 253 may be 45° or more.

Figure 12:
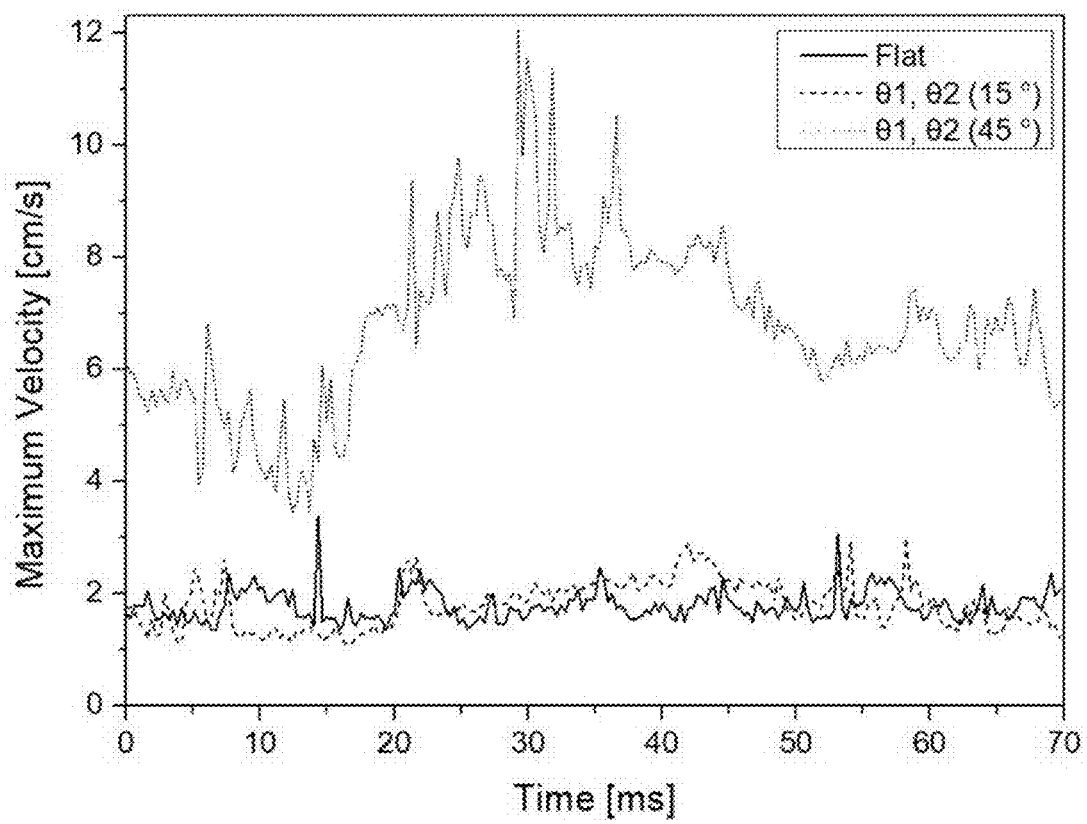
FIG. 12 is a graph showing the maximum velocity of a flow formed near teeth according to an embodiment of the present disclosure when the teeth move into a mixed fluid in a PIV test.

FIG. 12 shows the PIV test results when the teeth 250 move into the mixed fluid L, and the graph of FIG. 12 shows the maximum velocity of the flow formed near the space between the adjacent teeth 250 by capillary flow when the teeth 250 move into the mixed fluid L.

Here, as shown in the graph of FIG. 12, it can be seen that when the wings 230 of the impeller 200 do not have the teeth 250, or each of the front inclination angle θ1 and the rear inclination angle θ2 of the teeth 250 is 15°, a strong flow is not formed near the space between the adjacent teeth 250.

In particular, when the front inclination angle θ1 of the teeth 250 is too small, an angle between the tooth front surface 251 and the surface of the mixed fluid L is larger, and thus it difficult that the capillary flow of the mixed fluid L occurs.

When a strong flow is not formed near the space between the adjacent teeth 250, it is impossible to effectively separate the oil O from the teeth 250.

Accordingly, the teeth 250 according to an embodiment of the present disclosure may have the front inclination angle θ1 of 45° or more and the rear inclination angle θ2 of 45° or more.

Subsequently, as shown in FIG. 11(B the teeth 250 may be asymmetrically formed such that the front inclination angle θ1 of the tooth front surface 251 and the rear inclination angle θ2 of the tooth rear surface 253 are different from each other, and when the tooth front surface 251 and the tooth rear surface 253 are asymmetrically formed such that the front inclination angle θ1 of the tooth front surface 251 and the rear inclination angle θ2 of the tooth rear surface 253 are different from each other, it is possible to improve the oil separation function of the impeller 200.

For example, the teeth 250 may have the front inclination angle θ1 of the tooth front surface 251 of 75° and the rear inclination angle θ2 of the tooth rear surface 253 of 45°, so the front inclination angle θ1 of the tooth front surface 251 may be larger than the rear inclination angle θ2 of the tooth rear surface 253, and on the contrary, the teeth 250 may have the front inclination angle θ1 of the tooth front surface 251 of 45° and the rear inclination angle θ2 of the tooth rear surface 253 of 75°, so the front inclination angle θ1 of the tooth front surface 251 may be smaller than the rear inclination angle θ2 of the tooth rear surface 253.

In this instance, the teeth 250 according to an embodiment of the present disclosure may be asymmetrically formed such that the front inclination angle θ1 of the tooth front surface 251 and the rear inclination angle θ2 of the tooth rear surface 253 are different from each other, wherein the front inclination angle θ1 of the tooth front surface 251 is larger than the rear inclination angle θ2 of the tooth rear surface 253, thereby separating the oil O from the teeth 250 more easily.

Figure 13:
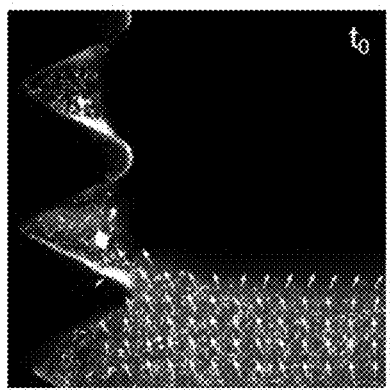
FIG. 13 is a photographic image showing a vector field representation of capillary flow differently found in presence or absence of an angle difference between a front inclination angle of a tooth front surface and a rear inclination angle of a tooth rear surface according to an embodiment of the present disclosure in a PIV test.
Figure 13:
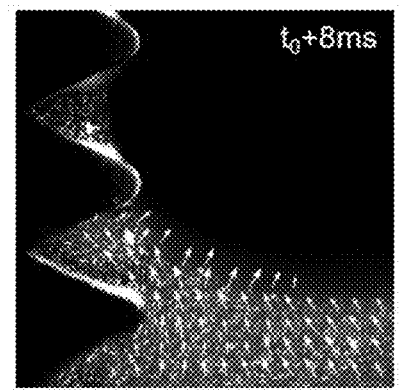
Figure 13:
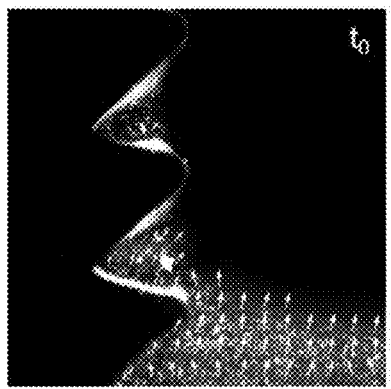
Figure 13:
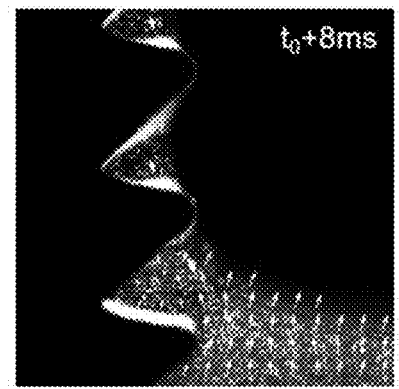
Figure 14:
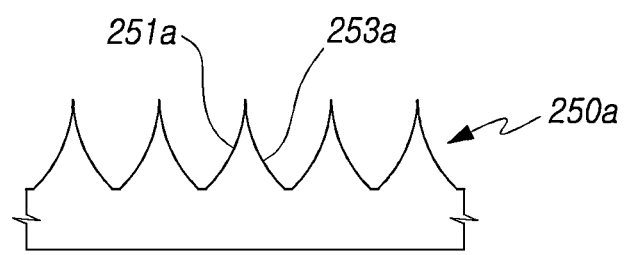
FIG. 14 is a diagram showing various embodiments of teeth formed in impeller wings of an oil transportation device according to an embodiment of the present disclosure.
Figure 14:
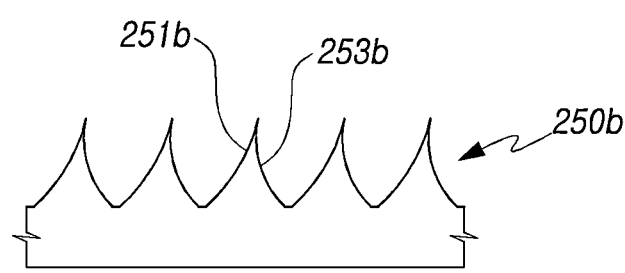
Figure 14:
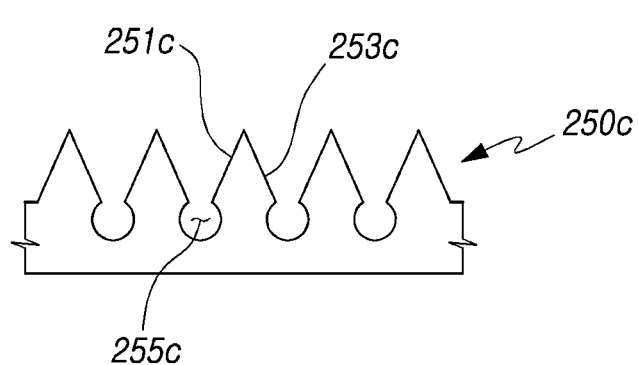

FIG. 13 is a photographic image of the vector field representation of the capillary flow differently found in the presence or absence of an angle difference between the front inclination angle θ1 of the tooth front surface 251 and the rear inclination angle θ2 of the tooth rear surface 253 in the PIV test, FIG. 13(A) shows that the front inclination angle θ1 of the tooth front surface 251 is equal to the rear inclination angle θ2 of the tooth rear surface 253, and FIG. 13(B) shows that the front inclination angle θ1 of the tooth front surface 251 is larger than the rear inclination angle θ2 of the tooth rear surface 253.

Referring to FIG. 13, compared to FIG. 13(A), FIG. 13(B) shows that the mixed fluid L is fed into the space between the teeth 250 and the fed mixed fluid L pushes the oil O in the space between the teeth 250 to form a stronger capillary flow that separates the oil O from the teeth 250.

When the front inclination angle θ1 of the tooth front surface 251 is larger than the rear inclination angle θ2 of the tooth rear surface 253, the capillary flow of the mixed fluid L starting from the tooth front surface 251 may occur more easily by the decreased angle between the tooth front surface 251 and the surface of the mixed fluid L when the teeth 250 move on to the mixed fluid L by the rotation of the wings 230.

When the teeth 250 are asymmetrically formed such that the front inclination angle θ1 of the tooth front surface 251 and the rear inclination angle θ2 of the tooth rear surface 253 are different from each other, wherein the front inclination angle θ1 of the tooth front surface 251 is larger than the rear inclination angle θ2 of the tooth rear surface 253, it is possible to improve the oil separation function of the impeller 200.

Subsequently, as shown in FIG. 14(A), the teeth 250a according to another embodiment of the present disclosure may have at least one of the tooth front surface 251a or the tooth rear surface 253a in the shape of a curved surface.

That is, the teeth 250 may have the tooth front surface 251 and the tooth rear surface 253 in flat shape as shown in FIG. 11, while the teeth 250 may have the tooth front surface 251 and the tooth rear surface 253 in the shape of a curved surface as shown in FIG. 14(A).

For example, as shown in FIG. 14(A), the teeth 250a may have the tooth front surface 251a and the tooth rear surface 253a in the shape of a curved surface which curves inwards, but is not necessarily limited thereto, and the teeth 250a may have any one of the tooth front surface 251a and the tooth rear surface 253a in the shape of a curved surface.

As described above, when the teeth 250a of the present disclosure are made of a hydrophilic material, as shown in FIGS. 4 and 6, the oil O present in the teeth 250a generally contacts the surface of the end of the teeth 250a, and the oil O does not directly contact other areas than the end by hydrophilicity.

Accordingly, when the tooth front surface 251a and the tooth rear surface 253a are formed in the shape of a curved surface, it is possible to minimize the contact surface with the oil O at the end of the teeth 250a, thereby separating the oil O from the teeth 250a more easily.

(Meanwhile, as shown in FIG. 13(B), the teeth 250b according to still another embodiment of the present disclosure may have the tooth front surface 251b and the tooth rear surface 253b in the shape of a curved surface which curves inwards, wherein the radius of curvature of the tooth front surface 251b and the radius of curvature of the tooth rear surface 253b may be different from each other.

To be more specific, the teeth 250b according to still another embodiment of the present disclosure may have the tooth front surface 251b and the tooth rear surface 253b in the shape of a curved surface which curves inwards, wherein the radius of curvature of the tooth front surface 251b is larger than the radius of curvature of the tooth rear surface 253b.

When the radius of curvature of the tooth front surface 251b is larger than the radius of curvature of the tooth rear surface 253b, the capillary flow of the mixed fluid L starting from the tooth front surface 251b may occur more easily due to the gentle angle between the tooth front surface 251b and the surface of the mixed fluid L when the teeth 250b move on to the mixed fluid L by the rotation of the wings 230.

Subsequently, as shown in FIG. 14(C), the teeth 250c according to further another embodiment of the present disclosure may have a liquid accommodating groove 255c in the space between the adjacent teeth 250c.

The mixed fluid L may be fed into the liquid accommodating groove 255c formed in the space between the teeth 250c, and the contact surface between the teeth 250c and the oil O may be minimized by the mixed fluid L fed into the liquid accommodating groove 255c, and accordingly it is possible to separate the oil O from the teeth 250c more easily.

Subsequently, the teeth 250 according to an embodiment of the present disclosure have the height h of 1 mm to 6 mm and the width w of 1 mm to 6 mm.

Here, the height h and the width w of the teeth 250 may be shown in FIG. 3.

When the height h and the width w of the teeth 250 are too large, the area in which capillary flow occurs is so locally formed compared to the size of the teeth 250, thereby failing to smoothly separate the oil O from the teeth 250.

On the contrary, when the height h and the width w of the teeth 250 are too small, it is difficult that the capillary flow and the consequential separation of the oil O separately occur.

Accordingly, the teeth 250 according to an embodiment of the present disclosure may have the height h of 1 mm to 6 mm and the width w of 1 mm to 6 mm, taking the capillary length (=2.7 mm) of water into account.

Here, the teeth 250 according to an embodiment of the present disclosure may have the thickness t of 3 mm or more, and when the thickness t of the teeth 250 is smaller than 3 mm, the capillary flow from the end of the teeth 250 to the bottom between the teeth 250 may not work smoothly by another capillary flow in the thickness-wise direction of the teeth 250.

As described above, according to an embodiment of the present disclosure, it is possible to separate the oil adhered to the wings from the teeth by capillary flow, thereby preventing oil debris from remaining on the surface of the wings, and thus continuously performing the oil transportation work.

Additionally, it is possible to separate the oil adhered to the wings from the teeth by capillary flow, thereby preventing the creation of solids deposited when oil that has not been separated from the wings of the impeller and remains on the wings is cooled again.

Although the foregoing describes that all the elements constituting the embodiment of the present disclosure are combined into one or work in combination, the present disclosure is not necessarily limited to the disclosed embodiment. That is, the elements may be selectively combined into at least one and work in combination within the intended scope of the present disclosure.

The foregoing description is provided to describe the technical spirit of the present disclosure for illustrative purposes only, and it is obvious to those having ordinary skill in the technical field pertaining to the present disclosure that various changes and modifications may be made thereto without departing from the essential features of the present disclosure. Therefore, the embodiments disclosed herein is for the purpose of describing the technical spirit of the present disclosure, and is not intended to be limiting of this disclosure, and the scope of technical spirit of the present disclosure s not limited by these embodiments. The scope of protection of the present disclosure should be interpreted by the appended claims, and the full technical spirit within its equivalent scope should be interpreted as falling within the scope of protection of the present disclosure.

DETAILED DESCRIPTION OF MAIN ELEMENTS

100: Transport unit
200: impeller
300: Driving means

What is claimed is:

1. A hydrophilic toothed impeller type oil transportation device, comprising:
   a transport unit provided such that a mixed fluid including an oil is fed on one side; and
   an impeller provided in the transport unit, the impeller including a core connected to a rotation axis, and wings extending radially from the core and having hydrophilic teeth on an outer surface to transport the mixed fluid including the oil to the other side of the transport unit by rotation,
   wherein the impeller is provided in the transport unit such that parts of the wings are exposed above a surface of the mixed fluid, to separate the oil adhered to the teeth while the mixed fluid is fed into a space between the adjacent teeth by capillary flow when the wings exposed above the surface of the mixed fluid move on to the mixed fluid by the rotation.

2. The hydrophilic toothed impeller type oil transportation device according to claim 1, wherein the teeth are formed radially along a lengthwise direction of the wings, and are formed along a chord direction of the wings.

3. The hydrophilic toothed impeller type oil transportation device according to claim 1, wherein the mixed fluid includes water.

4. The hydrophilic toothed impeller type oil transportation device according to claim 1, wherein the teeth have a nanostructure on a surface thereof, the nanostructure of at least one type selected from the group consisting of a nano-hair and a nano-pillar.

5. The hydrophilic toothed impeller type oil transportation device according to claim 1, the teeth are made of a porous material which absorbs water in the porous material.

6. The hydrophilic toothed impeller type oil transportation device according to claim 1, wherein the teeth have a front inclination angle of a tooth front surface of 45° or more and a rear inclination angle of a tooth rear surface of 45° or more.

7. The hydrophilic toothed impeller type oil transportation device according to claim 1, wherein the teeth have a front inclination angle of a tooth front surface and a rear inclination angle of a tooth rear surface which are different from each other.

8. The hydrophilic toothed impeller type oil transportation device according to claim 1, wherein the teeth are 1 mm to 6 mm in height and 1 mm to 6 mm in width.

* * * * *